(12) United States Patent
Xie

(10) Patent No.: US 11,217,138 B2
(45) Date of Patent: Jan. 4, 2022

(54) ELECTRONIC DEVICE

(71) Applicant: WUHAN CHINA STAR OPTOELECTRONICS SEMICONDUCTOR DISPLAY TECHNOLOGY CO., LTD., Hubei (CN)

(72) Inventor: Rui Xie, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 16/483,419

(22) PCT Filed: Nov. 28, 2018

(86) PCT No.: PCT/CN2018/117938
§ 371 (c)(1),
(2) Date: Aug. 4, 2019

(87) PCT Pub. No.: WO2020/082499
PCT Pub. Date: Apr. 30, 2020

(65) Prior Publication Data
US 2021/0280109 A1 Sep. 9, 2021

(30) Foreign Application Priority Data

Oct. 26, 2018 (CN) .......................... 201811255016.1

(51) Int. Cl.
*G09G 3/20* (2006.01)
*H04M 1/02* (2006.01)
(Continued)

(52) U.S. Cl.
CPC .............. *G09G 3/20* (2013.01); *H04M 1/026* (2013.01); *H04N 5/217* (2013.01);
(Continued)

(58) Field of Classification Search
CPC ............. G09G 3/3674; G09G 2360/14; G09G 2360/148
See application file for complete search history.

(56) References Cited

U.S. PATENT DOCUMENTS

2006/0256093 A1 11/2006 Furukawa et al.
2006/0262055 A1* 11/2006 Takahara .......... H01L 27/14678
345/81
(Continued)

FOREIGN PATENT DOCUMENTS

CN 101572048 A 11/2009
CN 104700798 A 6/2015
(Continued)

*Primary Examiner* — Kevin M Nguyen
(74) *Attorney, Agent, or Firm* — Mark M. Friedman

(57) ABSTRACT

An electronic device is provided. The electronic device includes a display screen including a multiplex pixel array having multiplex sub-pixels, wherein a driving signal is inputted to the display screen; and a camera disposed behind the display screen and corresponding to positions of the multiplex sub-pixels. The display screen further includes a control unit configured to control the multiplex sub-pixels not to receive the driving signal when receiving an instruction for taking pictures.

15 Claims, 4 Drawing Sheets

(51) Int. Cl.
  *H04N 5/217* (2011.01)
  *H04N 5/225* (2006.01)
  *H04N 5/243* (2006.01)
  *H04N 7/14* (2006.01)
  *H04R 1/02* (2006.01)

(52) U.S. Cl.
  CPC ........... *H04N 5/2257* (2013.01); *H04N 5/243* (2013.01); *H04N 7/142* (2013.01); *G09G 2300/0426* (2013.01); *G09G 2300/0804* (2013.01); *G09G 2310/0243* (2013.01); *G09G 2310/0267* (2013.01); *H04M 1/0264* (2013.01); *H04M 1/0266* (2013.01); *H04R 1/028* (2013.01)

(56) References Cited

U.S. PATENT DOCUMENTS

| | | | |
|---|---|---|---|
| 2008/0106629 A1* | 5/2008 | Kurtz | H04N 7/144 348/333.01 |
| 2017/0270894 A1 | 9/2017 | Tang et al. | |
| 2018/0262225 A1* | 9/2018 | Wen | G06F 1/1626 |

FOREIGN PATENT DOCUMENTS

| | | | |
|---|---|---|---|
| CN | 107221277 A | 9/2017 | |
| CN | 108664907 A | 10/2018 | |

\* cited by examiner

ELECTRONIC DEVICE

BACKGROUND OF DISCLOSURE

1. Field of Disclosure

The present disclosure relates to the field of display technology, and more particularly, to an electronic device.

2. Description of Related Art

With development of electronic devices such as cell phones, there is increase in demand for a higher screen ratio. In order to realize a greater screen ratio, technologies of cutting odd shapes are currently used to merely retain a non-display area 101 where a camera and an earphone are located for a display screen 10. Specifically, as shown in FIG. 1, a camera hole 11 and an earphone hole 12 are disposed on the display screen 10 to install the camera and the earphone, and the rest of the display screen 10 is used as a display area 102.

However, because the area 101 where the camera hole 11 and the earphone hole 12 are located fails to display pictures, the area of the display area is smaller.

Therefore, it is necessary to provide an electronic device to solve problems existing in conventional technologies.

SUMMARY

The object of the present disclosure is to provide an electronic device to enlarge an area of a display area so that a screen ratio is improved.

In order to solve the above technical problems, the present disclosure provides an electronic device, including:

a display screen including a pixel array including a multiplex pixel array and a display pixel array, wherein the display pixel array includes a plurality of display sub-pixels, wherein the multiplex pixel array includes a plurality of multiplex sub-pixels, and wherein a driving signal is inputted to the display screen; and a camera disposed behind the display screen and corresponding to positions of the plurality of multiplex sub-pixels;

wherein the display screen further includes a control unit configured to control the plurality of multiplex sub-pixels not to receive the driving signal when receiving an instruction for taking pictures and to control the plurality of multiplex sub-pixels to receive the driving signal when not receiving the instruction for taking pictures, wherein the display screen includes a gate driving chip, and wherein the plurality of multiplex sub-pixels are electrically connected to the gate driving chip through the control unit.

In the electronic device of the present disclosure, the control unit includes a plurality of controlling thin-film transistors, each row of the plurality of multiplex sub-pixels corresponds to one of the plurality of controlling thin-film transistors, and the display screen further includes a plurality of scan lines;

a control signal is inputted to gate electrodes of the plurality of controlling thin-film transistors, wherein the gate driving chip is connected to source electrodes of the plurality of controlling thin-film transistors, and wherein the control signal is generated according to the instruction for taking pictures; and each of the plurality of multiplex sub-pixels includes a driving thin-film transistor, wherein a gate electrode of the driving thin-film transistor is connected to an end of a corresponding scan line, and wherein a drain electrode of the one of the plurality of controlling thin-film transistors is connected to the other end of the corresponding scan line.

In the electronic device of the present disclosure, when the instruction for taking pictures is received, the plurality of controlling thin-film transistors are turned off; and when the instruction for taking pictures is not received, the plurality of controlling thin-film transistors are turned on.

In the electronic device of the present disclosure, the plurality of controlling thin-film transistors are P-type thin-film transistors; when the instruction for taking pictures is received, the control signal is at a high voltage level; and when the instruction for taking pictures is not received, the control signal is at a low voltage level.

In the electronic device of the present disclosure, the plurality of controlling thin-film transistors are N-type thin-film transistors; when the instruction for taking pictures is received, the control signal is at a low voltage level; and when the instruction for taking pictures is not received, the control signal is at a high voltage level.

In the electronic device of the present disclosure, the display screen further includes a plurality of data lines; and a source electrode of the driving thin-film transistor is connected to one of the plurality of data lines.

In the electronic device of the present disclosure, the plurality of display sub-pixels are configured to receive the driving signal while the display screen is working.

In the electronic device of the present disclosure, the electronic device further includes a housing and an earphone disposed on a sidewall of the housing.

In the electronic device of the present disclosure, a hole is disposed on the sidewall of the housing, and a position of the hole corresponds to a position of the earphone.

The present disclosure provides an electronic device, including:

a display screen including a pixel array including a multiplex pixel array, wherein the multiplex pixel array includes a plurality of multiplex sub-pixels, and wherein a driving signal is inputted to the display screen; and a camera disposed behind the display screen and corresponding to positions of the plurality of multiplex sub-pixels;

wherein the display screen further includes a control unit configured to control the plurality of multiplex sub-pixels not to receive the driving signal when receiving an instruction for taking pictures and to control the plurality of multiplex sub-pixels to receive the driving signal when not receiving the instruction for taking pictures.

In the electronic device of the present disclosure, the display screen includes a gate driving chip, and the plurality of multiplex sub-pixels are electrically connected to the gate driving chip through the control unit.

In the electronic device of the present disclosure, the control unit includes a plurality of controlling thin-film transistors, each row of the plurality of multiplex sub-pixels corresponds to one of the plurality of controlling thin-film transistors, and the display screen further includes a plurality of scan lines;

a control signal is inputted to gate electrodes of the plurality of controlling thin-film transistors, the gate driving chip is connected to source electrodes of the plurality of controlling thin-film transistors, and the control signal is generated according to the instruction for taking pictures; and each of the plurality of multiplex sub-pixels includes a driving thin-film transistor, a gate electrode of the driving thin-film transistor is connected to an end of a corresponding scan line, and a drain electrode of the one of the plurality of controlling thin-film transistors is connected to the other end of the corresponding scan line.

In the electronic device of the present disclosure, when the instruction for taking pictures is received, the plurality of controlling thin-film transistors are turned off; and when the instruction for taking pictures is not received, the plurality of controlling thin-film transistors are turned on.

In the electronic device of the present disclosure, the plurality of controlling thin-film transistors are P-type thin-film transistors; when the instruction for taking pictures is received, the control signal is at a high voltage level; and when the instruction for taking pictures is not received, the control signal is at a low voltage level.

In the electronic device of the present disclosure, the plurality of controlling thin-film transistors are N-type thin-film transistors; when the instruction for taking pictures is received, the control signal is at a low voltage level; and when the instruction for taking pictures is not received, the control signal is at a high voltage level.

In the electronic device of the present disclosure, the display screen further includes a plurality of data lines; and a source electrode of the driving thin-film transistor is connected to one of the plurality of data lines.

In the electronic device of the present disclosure, the pixel array further includes a display pixel array including a plurality of display sub-pixels configured to receive the driving signal while the display screen is working.

In the electronic device of the present disclosure, the electronic device further includes a housing and an earphone disposed on a sidewall of the housing.

In the electronic device of the present disclosure, a hole is disposed on the sidewall of the housing, and a position of the hole corresponds to a position of the earphone.

In the electronic device of the present disclosure, an area of a non-display area is reduced by disposing a front camera behind the display screen and causing the front camera to correspond to positions of a part of sub-pixels in the display screen, and thus the area of the display area is enlarged so that the screen ratio is improved.

DETAILED DESCRIPTION OF EMBODIMENTS

The following embodiments are described with reference to the accompanying drawings, which exemplify the realization of the invention. The directional terminologies of the present disclosure, such as "top", "bottom", "front", "back", "left", "right", "inner", "outer", "side", and the like are merely the directions with reference to the accompanying drawings. Therefore, the aforesaid directional terminologies are used to describe and comprehend the present disclosure without limiting the present disclosure. In the following drawings, the units having similar structures are marked by same numerals.

Figure 1:
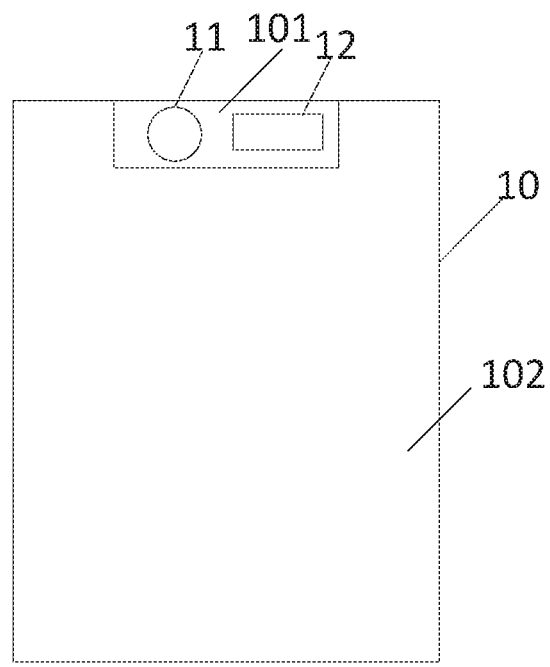
FIG. 1 is a schematic structural diagram of a conventional display screen.
Figure 2:
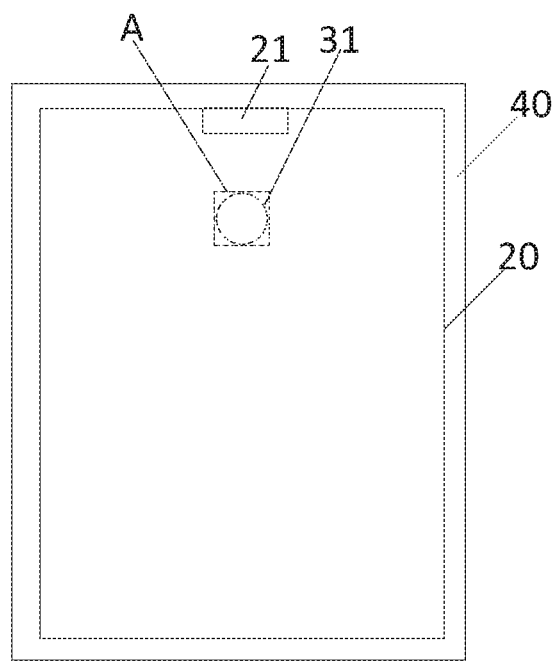
FIG. 2 is a schematic structural diagram of an electronic device according to a first embodiment of the present disclosure.

Please refer to FIGS. 2-7, wherein FIG. 2 is a schematic structural diagram of an electronic device according to a first embodiment of the present disclosure.

As shown in FIG. 2, the electronic device of the present disclosure includes a display screen 20, a camera 31, a housing 40, and an earphone (not shown).

A driving signal is inputted to the display screen 20 in order that the display screen 20 displays pictures. The driving signal includes a scan signal and a data signal. In combination with FIG. 4, the display screen 20 further includes a gate driving chip 24, a source driving chip 25, a plurality of scan lines 26, and a plurality of data lines 27. The gate driving chip 24 provides the scan signal through the scan lines 26, and the source driving chip 25 provides the data signal through the data lines 27.

The display screen 20 includes a pixel array which consists of sub-pixels R. G, and B. The pixel array includes a display pixel array (i.e., the pixel array outside an area A) and a multiplex pixel array 22.

The display pixel array includes a plurality of display sub-pixels (i.e., the sub-pixels outside the area A). The display sub-pixels are configured to receive the driving signal while the display screen 20 is working. That is, the display sub-pixels are considered as normal sub-pixels for displaying pictures while the display screen is working.

Figure 3:
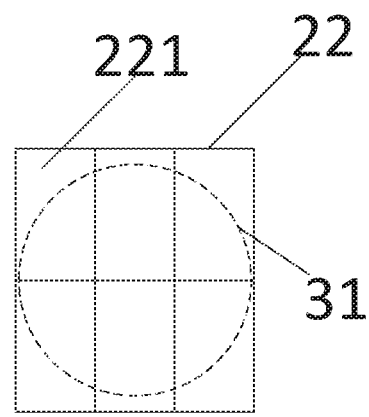
FIG. 3 is an enlarged view of schematic structure of an area A shown in FIG. 2.
Figure 5:
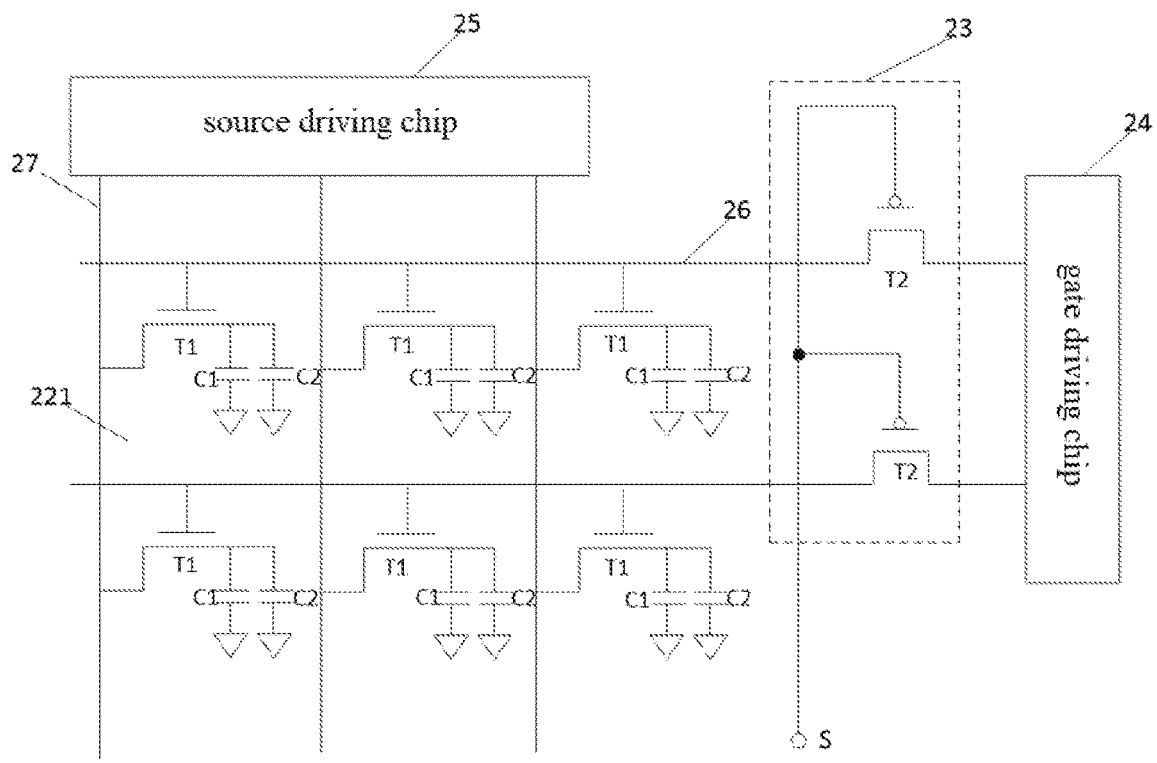
FIG. 5 is a specific circuit diagram of a multiplex pixel array of the present disclosure.

In combination with FIG. 3 and FIG. 5, the multiplex pixel array 22 includes a plurality of multiplex sub-pixels 221. In an embodiment, the multiplex sub-pixel 221 includes a driving thin-film transistor T1. A source electrode of the driving thin-film transistor T1 is connected to the data line 27. Specifically, the source electrode of the driving thin-film transistor T1 is connected to an end of the data line 27, and the other end of the data line 27 is connected to the source driving chip 25. A drain electrode of the driving thin-film transistor T1 is connected to a liquid crystal capacitor C1 and a storage capacitor C2.

Without limiting the present disclosure, in FIG. 3, for instance, the camera merely corresponds to six sub-pixels. In the present disclosure, the camera can correspond to positions of two or at least two sub-pixels.

As shown in FIG. 2, the camera 31 is disposed behind the display screen 20 and corresponds to positions of the multiplex sub-pixels 221. The camera 31 is a front camera and faces the display screen.

Figure 4:
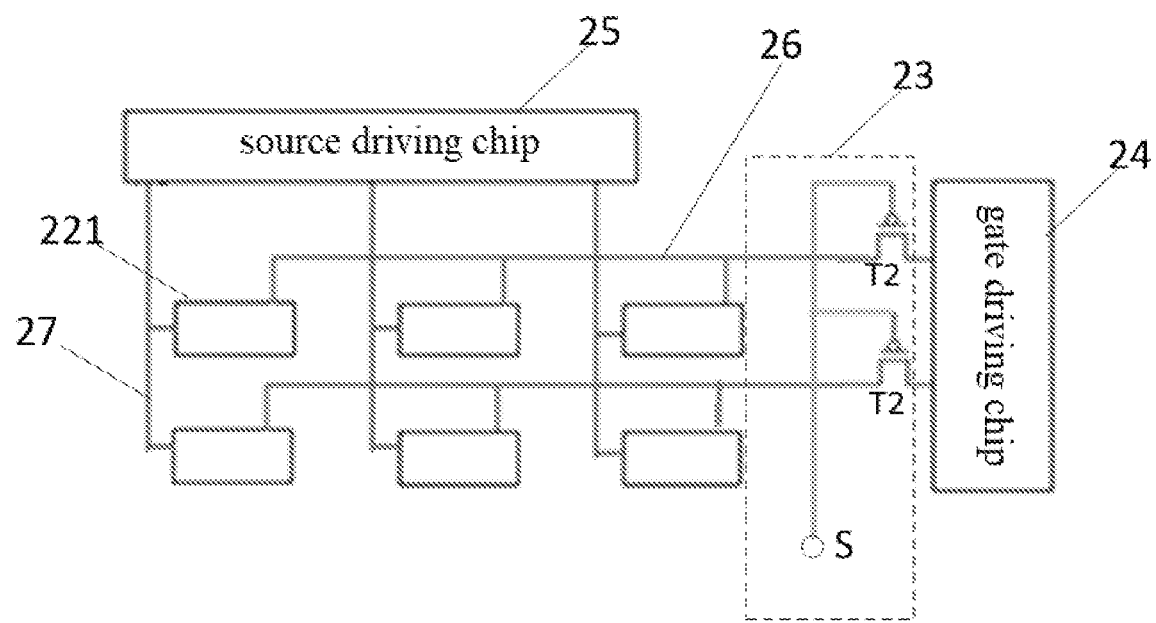
FIG. 4 is a circuit diagram of a multiplex pixel array of the present disclosure.

As shown in FIG. 4, the display screen 20 further includes a control unit 23 configured to control the multiplex sub-pixels 221 not to receive the driving signal when receiving an instruction for taking pictures and to control the multiplex sub-pixels 221 to receive the driving signal when not receiving the instruction for taking pictures. That is, the multiplex sub-pixels 221 do not display pictures when the camera 31 is used, and the multiplex sub-pixels 221 display pictures when the camera 31 is not used.

The multiplex sub-pixels 221 are electrically connected to the gate driving chip 24 through the control unit 23.

As shown in FIG. 4 and FIG. 5, the control unit 23 includes a plurality of controlling thin-film transistors T2. Each row of the multiplex sub-pixels 221 corresponds to one of the controlling thin-film transistors T2. A control signal S is inputted to gate electrodes of the controlling thin-film transistors T2. The gate driving chip 24 is connected to source electrodes of the controlling thin-film transistors T2. The control signal S is generated according to the instruction for taking pictures.

A gate electrode of the driving thin-film transistor T1 is connected to an end of a corresponding scan line 26, and a drain electrode of the controlling thin-film transistor T2 is connected to the other end of the scan line 26.

When the instruction for taking pictures is received, the controlling thin-film transistors T2 are turned off. At this moment, the gate electrode of the driving thin-film transistor T1 in the multiplex sub-pixel 221 fails to receive the scan signal, causing the driving thin-film transistor T1 to be turned off and further driving the source electrode of the driving thin-film transistor T1 not to receive the data signal.

When the instruction for taking pictures is not received, the controlling thin-film transistors T2 are turned on. At this moment, the gate electrode of the driving thin-film transistor T1 in the multiplex sub-pixel 221 can receive the scan signal. Thus, when the scan signal is at a high voltage level, the source electrode of the driving thin-film transistor T1 can receive the data signal.

In an embodiment, the controlling thin-film transistors T2 are P-type thin-film transistors. When the instruction for taking pictures is received, the control signal S is at a high voltage level. When the instruction for taking pictures is not received, the control signal S is at a low voltage level.

In another embodiment, the controlling thin-film transistors T2 are N-type thin-film transistors. When the instruction for taking pictures is received, the control signal S is at a low voltage level. When the instruction for taking pictures is not received, the control signal S is at a high voltage level.

A hole 21 is disposed on the display screen 20. A position of the hole 21 corresponds to a position of the earphone.

The housing 40 wraps around the sides and the back of the display screen 20.

A specific method of driving pixels in the display pixel array is the same to conventional driving methods.

In the electronic device of the present embodiment, an area of a non-display area is reduced by disposing the front camera behind the display screen and causing the front camera to correspond to positions of a part of sub-pixels in the display screen, and thus an area of a display area is enlarged so that a screen ratio is improved.

Figure 6:
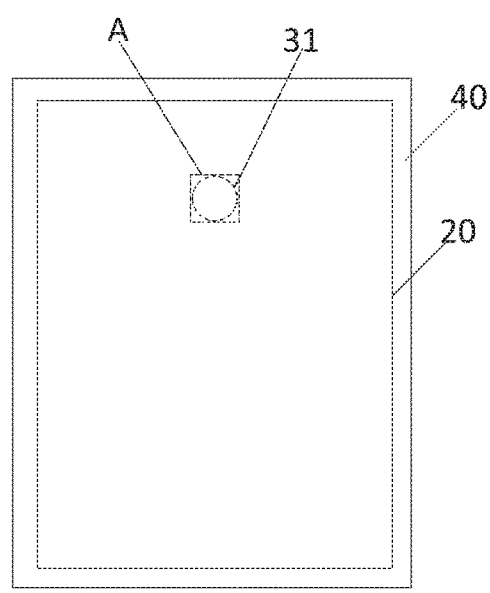
FIG. 6 is a schematic structural diagram of an electronic device according to a second embodiment of the present disclosure.
Figure 7:
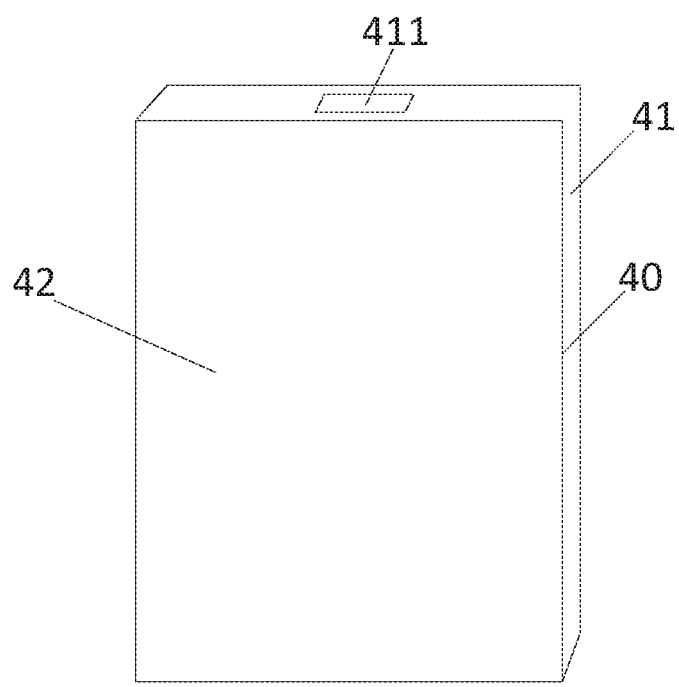
FIG. 7 is a schematic structural diagram of a housing shown in FIG. 6.

As shown in FIG. 6 and FIG. 7, in another embodiment, the earphone is disposed on a sidewall of the electronic device. The difference between the present and previous embodiments is that the earphone of the electronic device in the present embodiment is disposed on a sidewall 41 of the housing 40.

The housing 40 includes the sidewall 41 surrounding the display screen 20 and a body 42 disposed on the back of the display screen 20.

A hole 411 is disposed on the sidewall 41 of the housing 40. A position of the hole 411 corresponds to the position of the earphone. The position of the hole 411 can be located on any sidewall 41 of the housing 40. That is, in an embodiment, the earphone is disposed on the top sidewall or the bottom sidewall of the housing. In another embodiment, the earphone is disposed on the left sidewall or the right sidewall of the housing.

Based on the previous embodiment, in the electronic device of the present embodiment, the area of the non-display area is further reduced by disposing the earphone on the sidewall of the electronic device, and thus the area of the display area is further enlarged so that the screen ratio is improved.

In conclusion, although the present disclosure has been described with reference to the foregoing preferred embodiments thereof, it is not limited to the foregoing preferred embodiments. It is apparent to those skilled in the art that a variety of modifications and changes may be made without departing from the scope of the present disclosure which is intended to be defined by the appended claims.

What is claimed is:

1. An electronic device, comprising:
   a display screen comprising a pixel array comprising a multiplexed pixel array and a display pixel array, wherein the display pixel array comprises a plurality of display sub-pixels, the multiplexed pixel array comprises a plurality of multiplexed sub-pixels and is used to display pictures and used as an area corresponding to a camera for taking pictures, and a driving signal is inputted to the display screen; and
   the camera disposed behind the display screen and corresponding to positions of the plurality of multiplexed sub-pixels;
   wherein the display screen further comprises a control unit configured to control the plurality of multiplexed sub-pixels not to receive the driving signal when receiving an instruction for taking pictures and to control the plurality of multiplexed sub-pixels to receive the driving signal when not receiving the instruction for taking pictures;
   wherein the display screen comprises a gate driving chip, and the plurality of multiplexed sub-pixels are electrically connected to the gate driving chip by the control unit;
   the control unit comprises a plurality of controlling thin-film transistors, each row of the plurality of multiplexed sub-pixels corresponds to one of the plurality of controlling thin-film transistors, and the display screen further comprises a plurality of scan lines;
   wherein a control signal is inputted to gate electrodes of the plurality of controlling thin-film transistors, the gate driving chip is connected to source electrodes of the plurality of controlling thin-film transistors, and the control signal is generated according to the instruction for taking pictures; and
   wherein each of the plurality of multiplexed sub-pixels comprises a driving thin-film transistor, a gate electrode of the driving thin-film transistor is connected to an end of a corresponding scan line, and a drain electrode of the one of the plurality of controlling thin-film transistors is connected to another end of the corresponding scan line.

2. The electronic device of claim 1, wherein when the instruction for taking pictures is received, the plurality of controlling thin-film transistors are turned off, and when the instruction for taking pictures is not received, the plurality of controlling thin-film transistors are turned on.

3. The electronic device of claim 2, the plurality of controlling thin-film transistors are P-type thin-film transistors, when the instruction for taking pictures is received, the control signal is at a high voltage level, and when the instruction for taking pictures is not received, the control signal is at a low voltage level.

4. The electronic device of claim 2, the plurality of controlling thin-film transistors are N-type thin-film transistors, when the instruction for taking pictures is received, the control signal is at a low voltage level, and when the instruction for taking pictures is not received, the control signal is at a high voltage level.

5. The electronic device of claim 1, the display screen further comprises a plurality of data lines, and a source electrode of the driving thin-film transistor is connected to one of the plurality of data lines.

6. The electronic device of claim 1, the plurality of display sub-pixels are configured to receive the driving signal while the display screen is working.

7. The electronic device of claim 1, further comprising a housing and an earphone disposed on a sidewall of the housing.

8. The electronic device of claim 7, a hole is disposed on the sidewall of the housing, and a position of the hole corresponds to a position of the earphone.

9. An electronic device, comprising:
- a display screen comprising a pixel array comprising a multiplexed pixel array, wherein the multiplexed pixel array comprises a plurality of multiplexed sub-pixels and is used to display pictures and used as an area corresponding to a camera for taking pictures, and a driving signal is inputted to the display screen; and
- the camera disposed behind the display screen and corresponding to positions of the plurality of multiplexed sub-pixels;
- wherein the display screen further comprises a control unit configured to control the plurality of multiplexed sub-pixels not to receive the driving signal when receiving an instruction for taking pictures and to control the plurality of multiplexed sub-pixels to receive the driving signal when not receiving the instruction for taking pictures;
- wherein the display screen comprises a gate driving chip, and the plurality of multiplexed sub-pixels are electrically connected to the gate driving chip by the control unit;
- the control unit comprises a plurality of controlling thin-film transistors, each row of the plurality of multiplexed sub-pixels corresponds to one of the plurality of controlling thin-film transistors, and the display screen further comprises a plurality of scan lines;
- wherein a control signal is inputted to gate electrodes of the plurality of controlling thin-film transistors, the gate driving chip is connected to source electrodes of the plurality of controlling thin-film transistors, and the control signal is generated according to the instruction for taking pictures; and
- wherein each of the plurality of multiplexed sub-pixels comprises a driving thin-film transistor, a gate electrode of the driving thin-film transistor is connected to an end of a corresponding scan line, and a drain electrode of the one of the plurality of controlling thin-film transistors is connected to another end of the corresponding scan line.

10. The electronic device of claim 9, wherein when the instruction for taking pictures is received, the plurality of controlling thin-film transistors are turned off, and when the instruction for taking pictures is not received, the plurality of controlling thin-film transistors are turned on.

11. The electronic device of claim 10, wherein the plurality of controlling thin-film transistors are P-type thin-film transistors, when the instruction for taking pictures is received, the control signal is at a high voltage level, and when the instruction for taking pictures is not received, the control signal is at a low voltage level.

12. The electronic device of claim 10, wherein the plurality of controlling thin-film transistors are N-type thin-film transistors, when the instruction for taking pictures is received, the control signal is at a low voltage level, and when the instruction for taking pictures is not received, the control signal is at a high voltage level.

13. The electronic device of claim 9, the display screen further comprises a plurality of data lines and a source electrode of the driving thin-film transistor is connected to one of the plurality of data lines.

14. The electronic device of claim 9, the electronic device further comprising a housing and an earphone disposed on a sidewall of the housing.

15. The electronic device of claim 14, a hole is disposed on the sidewall of the housing, and a position of the hole corresponds to a position of the earphone.

* * * * *